(12) United States Patent
Kybelund et al.

(10) Patent No.: US 10,851,271 B2
(45) Date of Patent: Dec. 1, 2020

(54) DEGRADABLE FLOW MEDIUM FOR RESIN TRANSFER MOLDING PROCESSES

(71) Applicant: Siemens Gamesa Renewable Energy A/S, Brande (DK)

(72) Inventors: Peter Kybelund, Egtved (DK); Simon Kwiatkowski Pedersen, Aalborg (DK); Anders Haslund Thomsen, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 1166 days.

(21) Appl. No.: 14/138,020

(22) Filed: Dec. 21, 2013

(65) Prior Publication Data

US 2014/0186642 A1    Jul. 3, 2014

(30) Foreign Application Priority Data

Jan. 2, 2013 (EP) .................................... 13150029

(51) Int. Cl.
| B29C 70/02 | (2006.01) |
| B29C 70/54 | (2006.01) |
| B29C 70/48 | (2006.01) |
| B32B 27/04 | (2006.01) |

(Continued)

(52) U.S. Cl.
CPC ............. *C09J 137/00* (2013.01); *B29C 70/02* (2013.01); *B29C 70/547* (2013.01); *B32B 27/04* (2013.01); *C09J 125/06* (2013.01); *Y10T 428/31855* (2015.04); *Y10T 428/31938* (2015.04)

(58) Field of Classification Search
None
See application file for complete search history.

(56) References Cited

U.S. PATENT DOCUMENTS 3,862,287 A * 1/1975 Davis .................... B29C 70/521
156/167
5,026,410 A * 6/1991 Pollet ....................... C03C 25/26
427/389.8

(Continued)

FOREIGN PATENT DOCUMENTS

CN     101312820 A     11/2008
CN     101616787 A     12/2009

(Continued)

OTHER PUBLICATIONS

CN Office Action dated Oct. 31, 2016, for CN patent application No. 20140000658.2.

(Continued)

*Primary Examiner* — Lorna M Douyon
(74) *Attorney, Agent, or Firm* — Wolter Van Dyke Davis, PLLC

(57) ABSTRACT

A flow medium for assisting a resin to be transferred into a mold accommodating a layered structure of reinforced material is provided. The flow medium is configured such that when the resin is cured the flow medium becomes incorporated within a final composite component comprising the reinforced material embedded within the transferred and cured resin. A semifinished product comprising such a flow medium is provided and a method for producing a composite component by utilizing such a semifinished product is also provided.

17 Claims, 1 Drawing Sheet

(51) Int. Cl.
*C09J 137/00* (2006.01)
*C09J 125/06* (2006.01)

(56) References Cited

U.S. PATENT DOCUMENTS

| | | | | |
|---|---|---|---|---|
| 6,242,090 B1* | 6/2001 | Green | ............... | B29C 70/467 |
| | | | | 264/241 |
| 2003/0025232 A1* | 2/2003 | Slaughter | ........... | B29C 70/443 |
| | | | | 264/102 |
| 2003/0148090 A1* | 8/2003 | Lewit | ............ | B29C 44/1209 |
| | | | | 428/308.4 |
| 2006/0068170 A1* | 3/2006 | Hanson | ............. | B29C 70/44 |
| | | | | 428/174 |
| 2008/0079193 A1* | 4/2008 | Hanks | ............ | B29C 70/548 |
| | | | | 264/257 |
| 2008/0277053 A1* | 11/2008 | Stiesdal | ............ | B29C 70/342 |
| | | | | 156/245 |
| 2010/0086765 A1 | 4/2010 | Inston | | |

FOREIGN PATENT DOCUMENTS

| | | | |
|---|---|---|---|
| EP | 0375187 | * | 6/1990 |
| FR | 2870861 | A1 | 12/2005 |
| GB | 2360483 | A | 9/2001 |
| GB | 2381493 | A | 5/2003 |
| WO | 2007038930 | A1 | 4/2007 |
| WO | 2008099207 | A1 | 8/2008 |
| WO | 2005118266 | A1 | 12/2015 |

OTHER PUBLICATIONS

Luo Hesheng Guangdong; "Manual of Plastic Materials"; Science and Technology Press; p. 375; Mar. 31, 1988 (Concise explanation of relevancy p. 3 in translated CNOA attached).

* cited by examiner

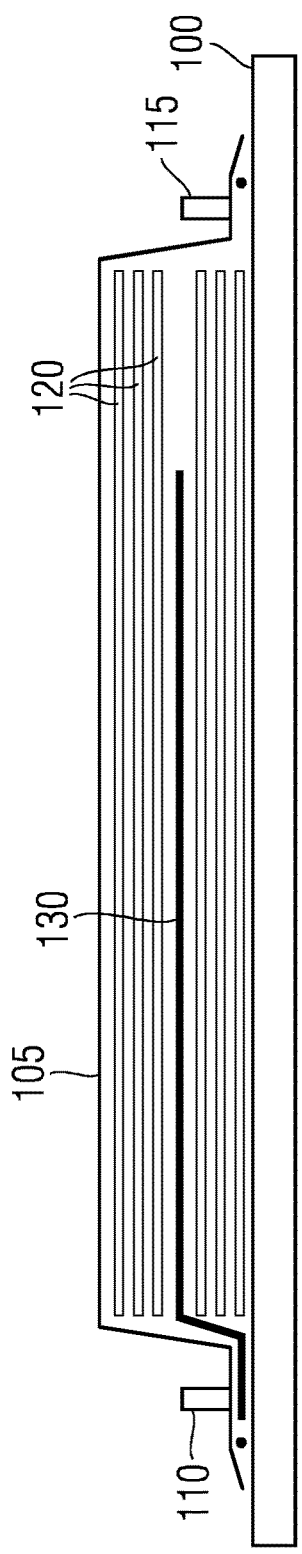
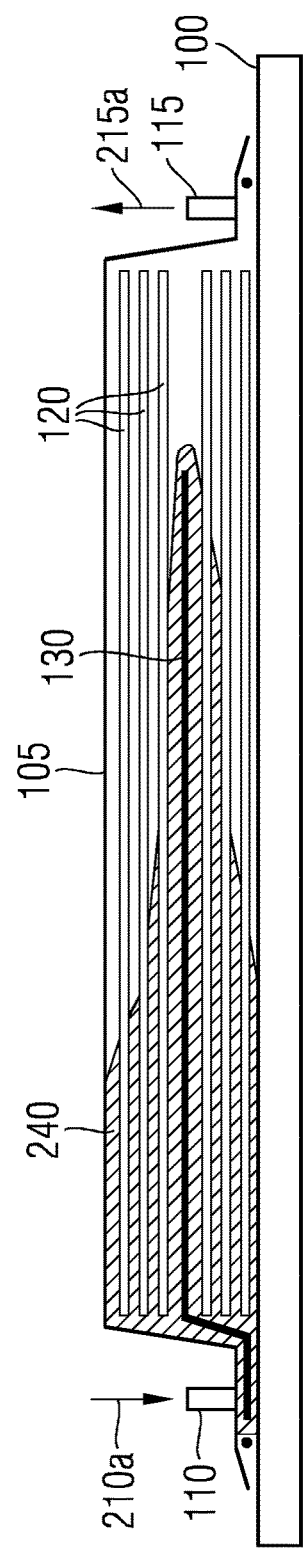
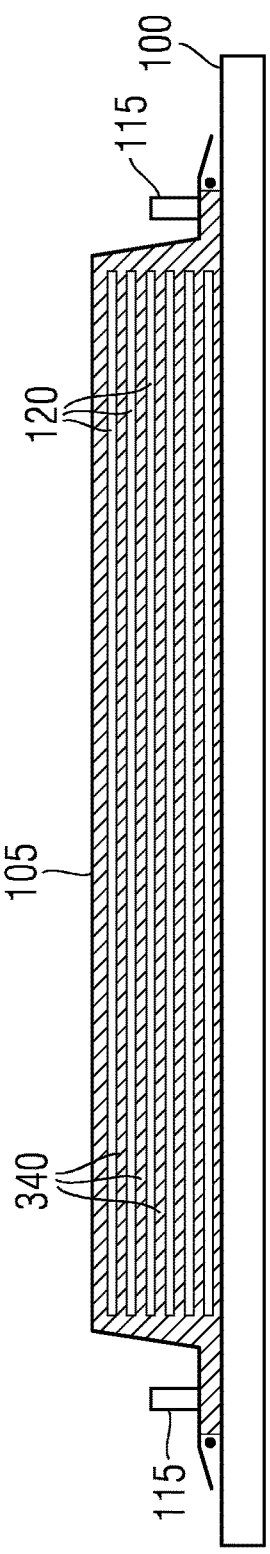

DEGRADABLE FLOW MEDIUM FOR RESIN TRANSFER MOLDING PROCESSES

CROSS REFERENCE TO RELATED APPLICATIONS

This application claims the benefit of European Application No. EP 13150029.0 filed Jan. 2, 2013, incorporated by reference herein in its entirety.

FIELD OF INVENTION

The present invention generally relates to the technical field of producing composite components by means of a resin transfer molding process. Specifically, the present invention relates to a flow medium for assisting a resin to be transferred into a mold. Further, the present invention relates to a semifinished product comprising such a flow medium and to a method for producing a composite component by utilizing such a semifinished product.

ART BACKGROUND

Composite infusions, such as, for example, Vacuum Assisted Resin Transfer Molding (VARTM), are closed-mold processes for fabricating large fiber-reinforced composite structures. In its simplest manifestation of composite infusions, a laminate fiber preform is installed onto a mold surface and sealed with an outer mold surface, for example, an outer sheet of flexible bagging material such as nylon or Mylar plastic. In VARTM, a vacuum is applied to remove entrapped air from the preform and resin is then allowed to infuse into the preform and cure. As typical thermosetting resins utilized for VARTM tend to have high viscosities, processing techniques have been developed to improve the speed and quality of resin infusion.

One preferred processing technique comprises the usage of a flow medium for a faster injection of resin into a fiber layup structure in order to produce a composite. Specifically, flow media are used in order to distribute resin within a fiber layup structure and to increase the injection speed of the resin into the fiber layup structure. Depending on the geometry and the final size of the produced composite component it is often not possible to inject the necessary amount of resin without the use of a flow medium, because the flow resistance of the resin into the fiber layup structure is too large.

A large number of different flow media are known which are usable for a variety of different processing conditions. However, common for all of these different flow media is the somewhat labor intensive lay-up of the respective flow medium and even more so, the removal of the respective flow medium after the resin within the composite component has been cured. Furthermore, during use, the flow medium absorbs a relative large amount of resin, which must subsequently be discarded. This makes the respective VARTM more complicated and, as a consequence, increases the production costs.

There may be a need for improving VARTM procedures.

SUMMARY OF THE INVENTION

This need may be met by the subject matter according to the independent claims. Advantageous embodiments of the present invention are described by the dependent claims.

According to a first aspect of the invention there is provided a flow medium for assisting a resin to be transferred into a mold accommodating a layered structure of reinforced material. The provided flow medium is configured in such a manner that when the resin is cured the flow medium becomes incorporated within a final composite component comprising the reinforced material embedded within the transferred and cured resin.

The described flow medium is based on the idea that when incorporating the flow medium into the final composite component there is no need for a usually time consuming post-processing of a casted composite component, wherein the flow medium has to be discarded after using e.g. by means of scraping off the flow medium and, if applicable, the resin which has been absorbed by the flow medium.

In accordance with the invention the described flow medium is made of a material which is highly compatible with the resin being used to form, together with the layered structure of reinforced material, the final composite component. Of course, the final composite component is the result of a Resin Transfer Molding (RTM) process and in particular of a Vacuum Assisted Resin Transfer Molding (VARTM) process. This compatibility of the flow medium with the resin may mean that the flow medium becomes a part of the final composite component at the latest during the last steps of composite component manufacture. This can be realized in particular if the flow medium is made from a material which can be degraded and/or dissolved by the resin and/or by a temperature rise which occurs during the curing reaction of the resin.

According to an embodiment of the invention the flow medium is formed as a mesh structure. This may provide the advantage that the flow medium can easily be inserted within the layered structure of reinforced material.

Preferably the flow medium is an elastic and/or flexible material, which can be inserted within the layered structure not only in a planar but also in a three-dimensionally curved manner. This may allow using the flow medium in a variety of different geometries of the layered structure of reinforced material.

For storage purposes the mesh structure can be retained on a large roll, from which appropriately sized pieces of the mesh layer respectively of the mesh structure can be cut.

According to a further embodiment of the invention the flow medium is made from a polymer material. Thereby, depending on the specific RTM or VARTM process a proper polymer material can be used.

The polymer material may be dissolvable in a solvent of the used resin. Preferably, the solubility of the polymer material is so high that it will be dissolved after a predetermined time of contact with the solvent.

Generally speaking, the material being used for the described degradable flow medium is closely linked to the resin or the resin system being used for RTM or VARTM. From a technical point of view this link may be given by solubility parameters which describe the capability of the flow medium to be degraded respectively dissolved within the final formed composite component.

According to a further embodiment of the invention the polymer material is polyvinyl butyral.

Polyvinyl butyral (PVB) has the advantage that it is dissolvable with a plurality of solvents. In particular, PVB is dissolvable also in epoxy, which is an important material for forming large composite components like e.g. wind turbine blades.

According to a further embodiment of the invention the polymer material is poly styrene. Poly styrene (PS) has the advantage that it is dissolvable in many types of resins. In particular, PS is dissolvable in styrene based resins respectively styrene based resin systems.

According to a further embodiment of the invention the flow medium has a melting point in a range between 30° C. and 150° C. This may provide the advantage that the flow medium will be melted because of heat being generated by an exothermic curing reaction of the transferred resin. In this way the flow medium becomes a part of the final composite component which consists of (a) cured resin, (b) first melted and secondly solidified flow medium, and (c) the reinforced material being embedded within the transferred and cured resin.

Using a material being melted when having a temperature being reached in a resin curing procedure has the advantage that the described flow medium can also be used in connection with resins or resin systems which do not contain a solvent (non-solvent containing resin).

In this respect it is mentioned that for non-solvent containing resins, the material of the flow medium can be chosen so as to be very similar to the resin. In this case the flow medium can also be absorbed by the transferred resin during a heating and/or curing procedure. As a consequence, the flow medium will also be incorporated into the final composite component even if it is not melted during the curing reaction. Such an absorption of the flow medium can be realized e.g. if the flow medium is a solid epoxy material and the resin being transferred into the mold is an epoxy resin.

According to a further aspect of the invention there is provided a semifinished product for producing a composite component by means of a resin transfer molding method, in particular by means of a vacuum assisted resin transfer molding method. The provided semifinished product comprises (a) at least two layers of a reinforced material, and (b) a flow medium as set forth in any one of the preceding claims, wherein the flow medium is located at least partially in between the at least two layers.

The described semifinished product is based on the idea that by using the above elucidated flow medium being placed in between the two layers of reinforced material, the composite component can be produced in such a manner that after the produced composite component has been removed from a mold a costly removal, e.g. by means of scraping, of materials resulting from a non degradable flow medium can be avoided. This makes the whole composite component production process much easier.

Particularly, it is no more necessary to carry out a final production step, wherein workers are in close contact with a newly cured composite. Since such a close contact is typically an issue with regards to health and safety, the healthy requirements can be easily fulfilled when producing composite components.

Descriptive speaking, with the described semifinished product it is possible to introduce flow layers inside the composite and between different reinforcement layers, where known non-degradable flow media would deteriorate the composite properties.

The reinforced material may be any known material which can be used (a) to enhance the strength of the final composite component and/or (b) to contribute to a shape forming of the semifinished product before or during being placed into a mold. In particular, the reinforced material may be a fiber reinforced material.

According to a further embodiment of the invention the flow medium comprises an adhesiveness, in particular an adhesiveness with respect to the reinforced material. This may provide the advantage that the flow medium can act as a glue. Such a behavior can be utilized for shape forming the semifinished product already before the resin is transferred. Benefit can be taken from the adhesiveness of the flow medium in particular when arranging layers of reinforced material in a direction being angular with respect to the main direction of the resin transfer.

According to a further aspect of the invention the there is provided a method for producing a composite component. The provided method comprises (a) assembling a semifinished product as described above, (b) placing the assembled semifinished product into a mold, (c) transferring resin into the mold, and (d) curing the resin such that the composite component comprising the layers of reinforced material and the cured resin is produced.

Also the described method is based on the idea that by using a degradable flow medium a costly post processing of the produced component can be omitted, in which post processing materials resulting from a non degradable flow medium have to be removed from the composite component.

According to an embodiment of the invention assembling the semifinished product comprises (a) arranging a pre-fabricated layer of flow medium onto a first layer of the at least two layers of reinforced material, and (b) arranging the second layer of the at least two layers of reinforced material onto the pre-fabricated layer. This may provide the advantage that well established methods and shapes, which are known for conventional layers of non-degradable flow media, can be employed in connection with a degradable flow media in order to produce the pre-fabricated layer of degradable flow medium.

Arranging the pre-fabricated layer of flow medium onto the first layer of reinforced material can be done when the first layer of reinforced material has already been placed into the mold.

According to an embodiment of the invention assembling the semifinished product comprises (a) depositing the material of the flow medium onto a first layer of the at least two layers of reinforced material, such that a layer of flow medium is generated onto the first layer, and (b) arranging the second layer of the at least two layers of reinforced material onto the layer of flow medium. This may provide the advantage that the shape and/or the form of the layer of flow medium can be perfectly adapted to the form and/or to the shape of the first layer of reinforced material.

Descriptive speaking, the layer of flow medium can be generated by depositing the "unformed" material of the flow medium onto the first layer of reinforced material in such a manner that the layer of flow medium is formed onto the first layer of reinforced material. Thereby, depositing the unformed flow medium onto the first layer can be done when the first layer of reinforced material has already been placed into the mold.

Depositing the material of the flow medium onto the first layer of reinforced material can be realized e.g. by spraying the flow medium material onto the first layer of reinforced material in a predefined pattern.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the example of embodiment to be described hereinafter and are explained with reference to the example of embodiment. The invention will be described in more detail hereinafter with reference to examples of embodiment but to which the invention is not limited.

BRIEF DESCRIPTION OF THE DRAWING

FIGS. 1 to 3 illustrate a VARTM procedure wherein in accordance with an embodiment of the invention a degradable flow medium is used.

DETAILED DESCRIPTION

The illustration in the drawing is schematically. It is noted that in different figures, similar or identical elements are provided with the same reference signs.

FIG. 1 shows a first step of a VARTM procedure in accordance with an embodiment of the invention. A plurality of reinforcement layers 120 are arranged within a mold. The mold comprises a mold platform 100 and a vacuum bag 105. The reinforcement layers 120 are arranged with respect to each other in a stacked manner.

In accordance with the known technology of VARTM the mold comprises a resin inlet 110 and an air outlet 115.

In between two reinforcement layers 120 there is provided a layer of degradable flow medium 130. It is mentioned that in accordance with the invention one or more layers of degradable flow medium 130 could be used. For the sake of clarity of the illustration in the Figures there is shown an embodiment with only one layer of degradable flow medium 130. However, using more layers of degradable flow medium 130 would be advantageous, if one layer of degradable flow medium 130 is respectively arranged or sandwiched within two neighboring reinforcement layers 120.

FIG. 2 shows a second step of the VARTM procedure. Resin 240 is inserted via the resin inlet 110. This is illustrated by the arrow 210a. Further, air is drawn by means of a not depicted vacuum pump via the air outlet 115. This is illustrated by the arrow 215a. The degradable flow medium 130 contributes that the resin can be drawn with a higher speed into the mold such that the space between the reinforcement layers 120 is filled with resin 240 and the resin soaks into the reinforcement layers 120.

FIG. 3 shows a third step of the VARTM procedure. The resin has been cured. Thereby, the degradable flow medium 130 has been dissolved within the resin such that resin with dissolved flow medium 340 is used to build up the composite component. There is no need to remove residuals of the degradable flow medium 130. It is only necessary to remove the vacuum bag 105 and take away the produced composite component from the mold platform 100.

The invention claimed is:

1. A flow medium comprising a degradable material configured for assisting a resin to be transferred into a mold accommodating a layered structure of reinforced material, wherein the flow medium comprises a composition selected such that when the resin is cured in the presence of the flow medium, the flow medium degrades and becomes incorporated within a final composite component comprising the reinforced material embedded within the transferred and cured resin, wherein the flow medium further comprises adhesiveness with respect to the reinforced material.

2. The flow medium as set forth in claim 1, wherein the flow medium is formed as a mesh structure, and the flow medium becomes incorporated with the final composite component when the mesh structure is degraded.

3. The flow medium as set forth in claim 1, wherein the flow medium comprises a polymer material.

4. The flow medium as set forth in claim 3, wherein the polymer material is polyvinyl butyral.

5. The flow medium as set forth in claim 3, wherein the polymer material is poly styrene.

6. The flow medium as set forth in claim 1, wherein the flow medium has a melting point in a range between 30° C. and 150° C. and said melting point is below a curing temperature of the resin, thereby allowing the flow medium to degrade by melting.

7. The flow medium as set forth in claim 1, wherein the flow medium comprises a solid epoxy material.

8. The flow medium as set forth in claim 7, wherein the resin comprises an epoxy resin.

9. A method for producing a composite component, the method comprising
assembling a semifinished product comprising at least two layers of a reinforced material, and a flow medium as set forth in claim 1, wherein the flow medium is located at least partially in between the at least two layers,
placing the assembled semifinished product into a mold,
transferring resin into the mold, and
degrading the flow medium by curing the resin such that the composite component comprising the layers of reinforced material and the cured resin is produced.

10. The method as set forth in claim 9, wherein
assembling the semifinished product comprises
arranging a pre-fabricated layer of the flow medium onto a first layer of the at least two layers of reinforced material, and
arranging the second layer of the at least two layers of reinforced material onto the pre-fabricated layer.

11. The method as set forth in claim 9, wherein
assembling the semifinished product comprises
depositing the flow medium onto a first layer of the at least two layers of reinforced material, such that a layer of flow medium is generated onto the first layer, and
arranging the second layer of the at least two layers of reinforced material onto the layer of flow medium.

12. A flow medium, comprising:
a degradable material configured as a mesh structure effective to assist a resin transfer into a mold containing the flow medium and a reinforcement material;
wherein the flow medium further comprises an adhesiveness with respect to the reinforcement material; and
wherein the degradable material comprises a composition such that, when the resin is cured within the mold in the presence of the degradable material, the degradable material degrades to lose its mesh structure and to become incorporated within the resin.

13. The flow medium as set forth in claim 12, wherein the degradable material comprises polyvinyl butyral.

14. The flow medium as set forth in claim 12, wherein the degradable material comprises poly styrene.

15. The flow medium as set forth in claim 12, wherein the degradable material comprises a melting point below a curing temperature of the resin.

16. The flow medium as set forth in claim 12, wherein the degradable material comprises a solid epoxy material.

17. The flow medium as set forth in claim 16, wherein the resin comprises an epoxy resin.

* * * * *